United States Patent
Gremetz et al.

(10) Patent No.: US 9,827,549 B2
(45) Date of Patent: Nov. 28, 2017

(54) MODULAR REACTOR AND SYSTEM

(75) Inventors: Sylvain Maxime F Gremetz, Montereau Fault Yonne (FR); Aurelie Guichard, Champigny (FR); Roland Guidat, Blennes (FR); Olivier Lobet, Mennecy (FR); Stephane Poissy, Brunoy (FR); Pierre Woehl, Strasbourg (FR)

(73) Assignee: Corning Incorporated, Corning, NY (US)

( * ) Notice: Subject to any disclaimer, the term of this patent is extended or adjusted under 35 U.S.C. 154(b) by 21 days.

(21) Appl. No.: 13/318,385

(22) PCT Filed: May 11, 2010

(86) PCT No.: PCT/US2010/034336
§ 371 (c)(1),
(2), (4) Date: Nov. 1, 2011

(87) PCT Pub. No.: WO2010/132412
PCT Pub. Date: Nov. 18, 2010

(65) Prior Publication Data
US 2012/0045377 A1    Feb. 23, 2012

(30) Foreign Application Priority Data
May 11, 2009    (EP) .................................... 09305420

(51) Int. Cl.
B01L 3/00     (2006.01)
B01J 19/00    (2006.01)
B01L 9/00     (2006.01)

(52) U.S. Cl.
CPC ..... *B01J 19/0093* (2013.01); *B01L 3/502715* (2013.01); *B01J 2219/0081* (2013.01);
(Continued)

(58) Field of Classification Search
CPC ................... B01L 2300/0816; B01L 3/502715
(Continued)

(56) References Cited

U.S. PATENT DOCUMENTS 5,580,523 A    12/1996  Bard
6,537,506 B1    3/2003  Schwalbe et al.
(Continued)

FOREIGN PATENT DOCUMENTS

DE    19917398 A1    10/2000
EP    1352686 A1     10/2003
EP    1925364 A1     5/2008

OTHER PUBLICATIONS

Machine Translation DE19746585.
Machine Translation JP2007247867.
CN201080021258.X Search Report.
JP2012-510921 Notice of Grounds for Rejection.

*Primary Examiner* — Natalia Levkovich
(74) *Attorney, Agent, or Firm* — Gregory V. Bean

(57) ABSTRACT

In one aspect the invention relates to reactors and a reactor system that include multiple microstructures each having a first edge and a second edge and an entrance side (18) and including an entrance port (22) and one or more other ports through the entrance side with all of the ports through the entrance side (32a, 32b) arranged in a standard pattern and closer to the first edge than the second edge. Desirably, the entrance port (22) and an exit port (24) are concentric.

6 Claims, 10 Drawing Sheets

(52) U.S. Cl.
CPC ......... *B01J 2219/00783* (2013.01); *B01J 2219/00824* (2013.01); *B01J 2219/00831* (2013.01); *B01J 2219/00997* (2013.01); *B01L 3/565* (2013.01); *B01L 9/527* (2013.01); *B01L 2200/027* (2013.01); *B01L 2200/028* (2013.01)

(58) Field of Classification Search
USPC .......................... 422/502, 603, 560, 566
See application file for complete search history.

(56) References Cited

U.S. PATENT DOCUMENTS

| | | |
|---|---|---|
| 6,832,787 B1 | 12/2004 | Renzi ................. 285/124.1 |
| 7,007,709 B2 | 3/2006 | Guzman et al. ............ 137/13 |
| 7,468,165 B2 | 12/2008 | Oberbeck et al. |
| 7,919,062 B2 | 4/2011 | Yuen |
| 8,920,742 B2 | 12/2014 | Noren |
| 9,126,202 B2 | 9/2015 | Lobet et al. |
| 2002/0124896 A1* | 9/2002 | O'Connor et al. ........ 137/833 |
| 2003/0113679 A1* | 6/2003 | Bakshi et al. ............ 431/154 |
| 2004/0096359 A1 | 5/2004 | Sarrut et al. |
| 2004/0265190 A1 | 12/2004 | Pieper et al. |
| 2005/0025677 A1 | 2/2005 | Oberbeck et al. |
| 2006/0171864 A1 | 8/2006 | Caze et al. |
| 2007/0280855 A1 | 12/2007 | Matteo |
| 2009/0010820 A1 | 1/2009 | Fehm et al. |
| 2009/0183791 A1 | 7/2009 | Lobet et al. ............... 137/597 |

\* cited by examiner

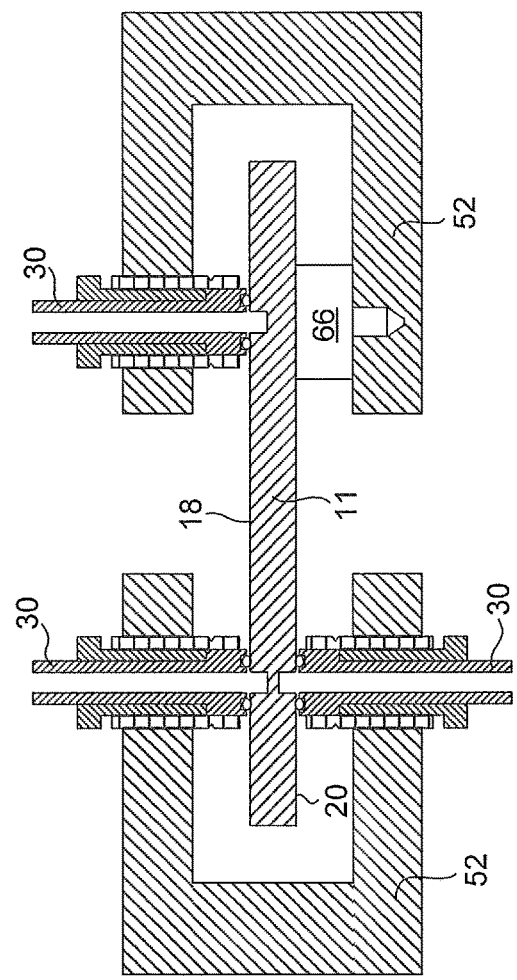
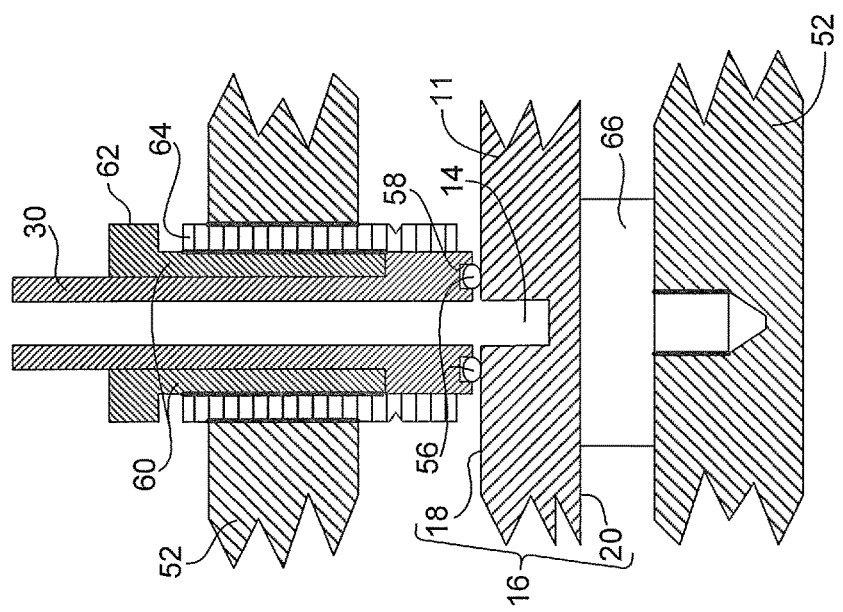
Fig. 1
Fig. 2

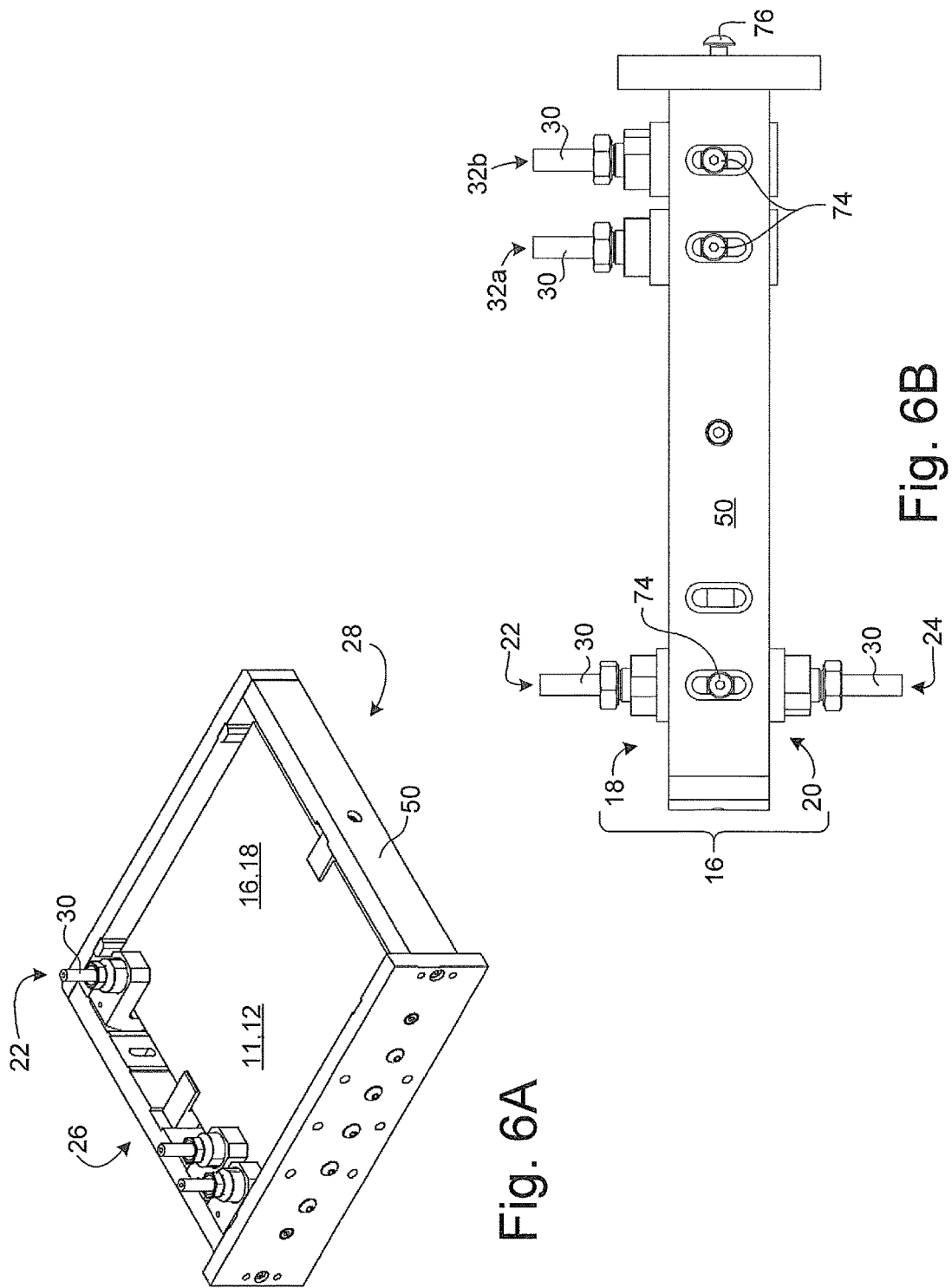

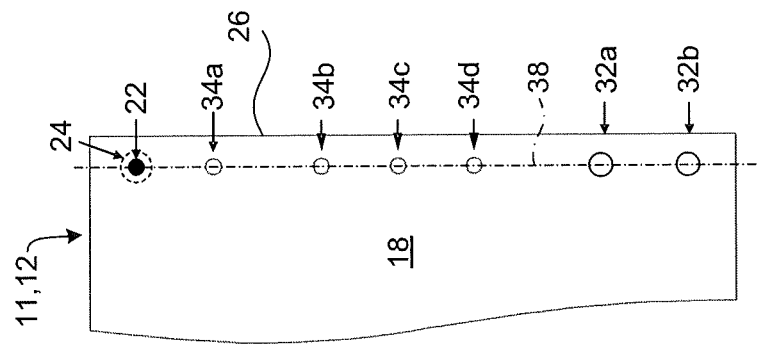
Fig. 9
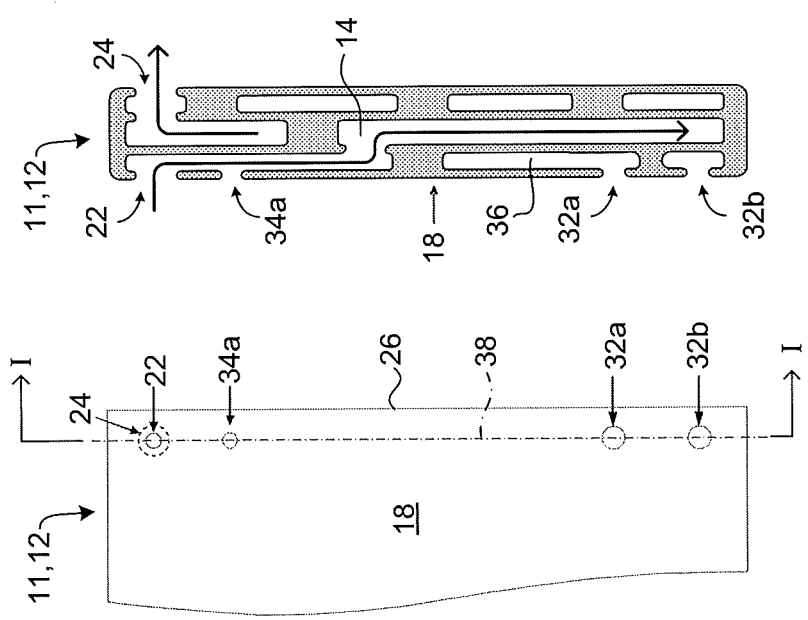
Fig. 8B
Fig. 8
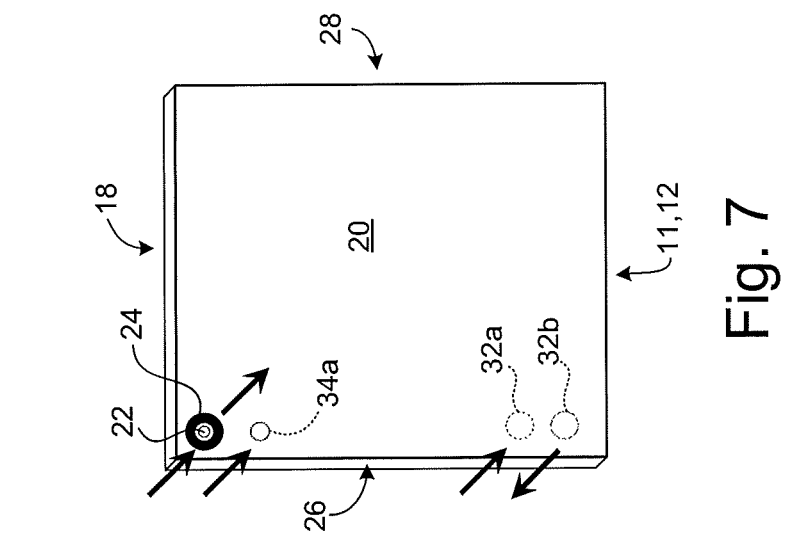
Fig. 7

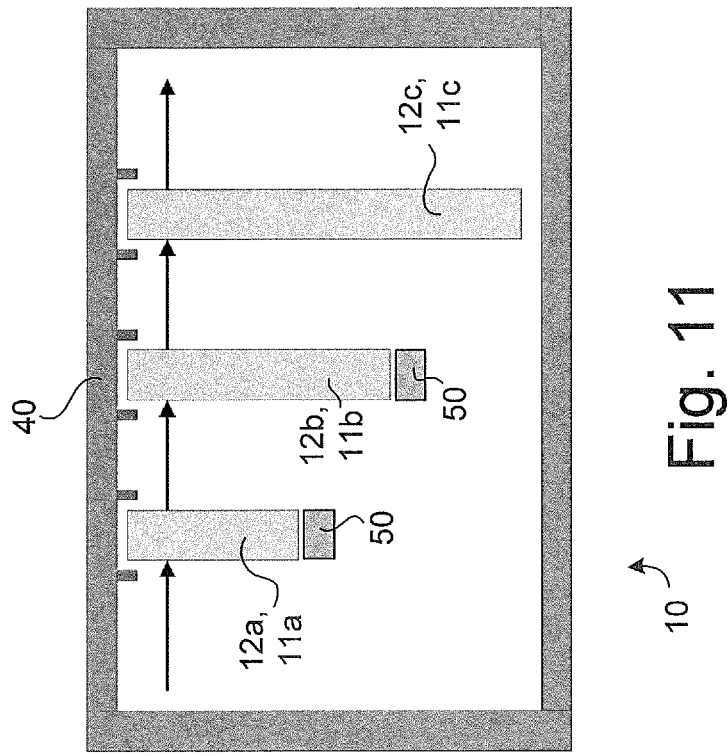
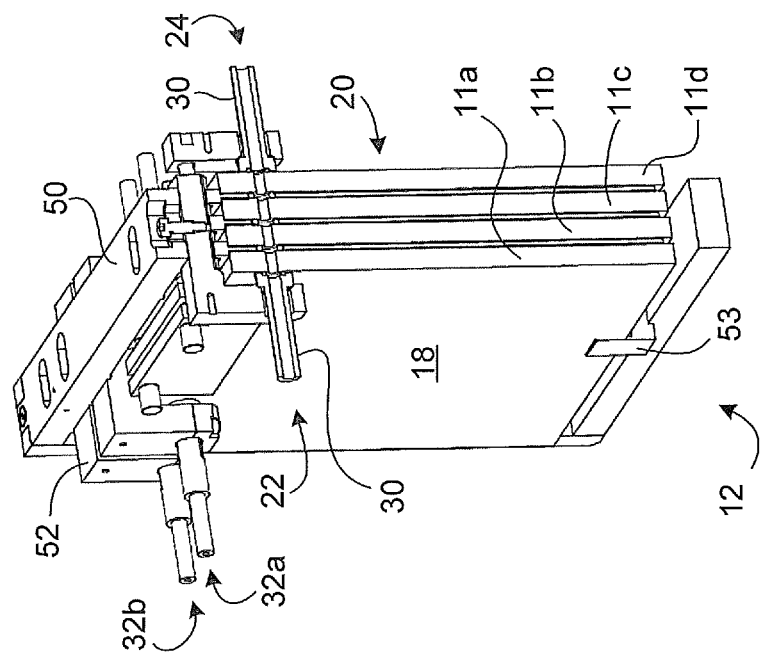
Fig. 11
Fig. 10

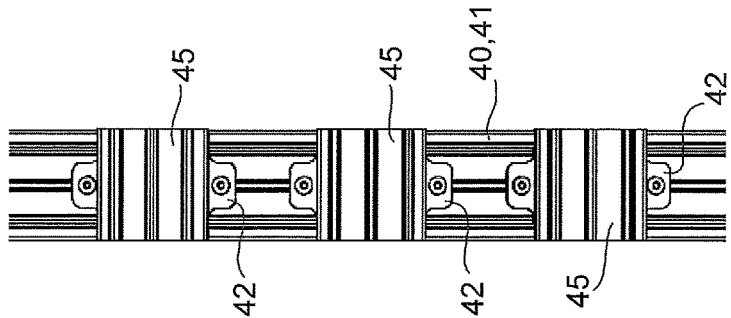
Fig. 15A
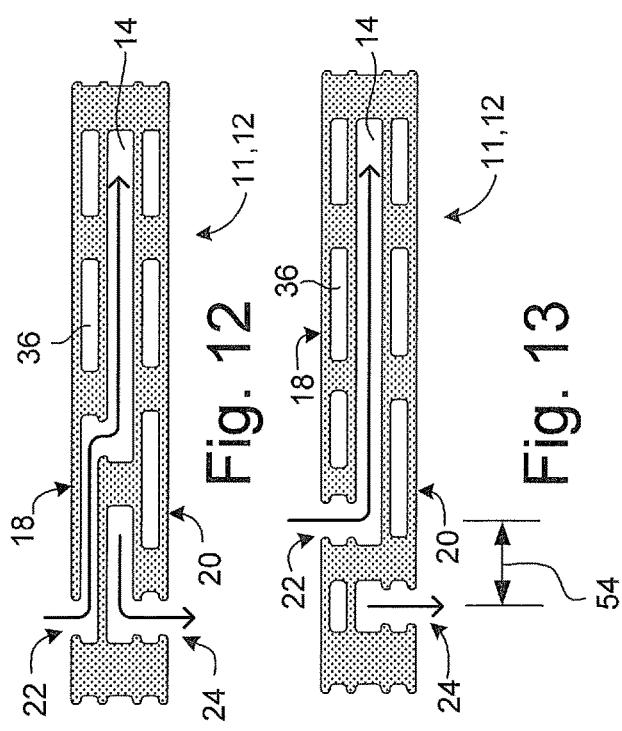
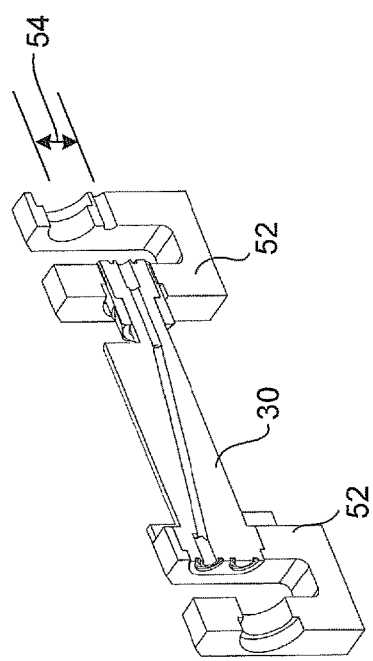

US 9,827,549 B2

MODULAR REACTOR AND SYSTEM

PRIORITY

This application claims priority to European Patent Application number 09305420.3, filed May 11, 2009, titled "Modulator Reactor and System".

BACKGROUND OF THE INVENTION

Field of the Invention

The present invention concerns modular microstructured reactors and reactor systems. It more particularly relates to glass, glass-ceramic and ceramic microfluidic devices and systems and their connection and interconnection to form modular reactors.

Technical Background

Fluidic devices including microstructured features, more particularly glass, glass-ceramic and ceramic microfluidic devices (microstructures), are described in numerous patents, for example in U.S. Pat. No. 7,007,709.

They may be drilled on back or (and) front face(s) to provide inlets and outlets for reactants as well as, typically, thermal fluid inlets and outlets. Specific connection systems have already been described.

Such connection systems have more particularly been described in patent applications FR 2 821 657 and WO 2005/107 937 (in both documents, multiport connectors with polymer seal are described. A face connection is ensured but it induces a mechanical stress on the microstructure), also in patent application EP 1 925 364 (the described connection implies the cooperation of female and male parts) and patent application US 2007/280855 (the connector is here secured to the microreactor via mechanical means (by screw, peg or other fastener)). The applicant has also proposed a specific connection system in patent application EP 1 854 543. Said specific connection system is shown in annexed prior art FIGS. 1-5.

As shown in the cross section of FIG. 1, according to EP 1 854 543, fluidic connection at each inlet and outlet is achieved by means of an O-ring 56 constrained in an O-ring groove 58 in a fluid connector 30, held against an entrance face 18 of a microstructure 11 by a adjustable tensioner 60 in the form of a threaded fitting with a grip surface or wrench surface 62 for easy adjustment of tension produced by a threaded joint 64. a tension or force transmitting member generally in the form of a c-clamp 52 reaches at least partly around both sides 18, 20 of the outer surface 16 of the microstructure 11, so as to be able to press a pad 66 (typically an elastomeric pad) onto the surface 20 opposite the O-ring 56. Thus forces on the microstructure 11 due to the compression of the O-ring are limited to compressive forces, well tolerated by glass, glass-ceramics and ceramics, preferred materials for microstructure 11.

As an alternative to the pad 66, the opposing surface 20 of the microstructure 11 may be contacted by another O-ring and fluid connector 30, as shown at the left of FIG. 2. Individual C-clamps 52 keep shear forces from arising between the O-ring sites. As seen in FIGS. 3A and 3B, C-clamps 52 are generally secured in frames 50. As shown in FIG. 4, Frames 50 are then mounted within a larger structural support frame 68, which may additional support beams 70 to optimally position the microstructures 11. As shown in FIG. 5, larger modular reactors can be built up by combining multiple structural support frames 68 into a frame assembly 72.

Although the connection and interconnection system of application EP 1 854 543 reflected in FIGS. 1-5 is versatile, it can require multiple custom piece or custom assembly arrangements, such at the two very difference C-clamp patterns shown in FIGS. 3A and 3B. An modular reactor and reactor system providing both flexibility and simplicity of interconnection is thus desirable.

SUMMARY OF THE INVENTION

The present invention provides, in one aspect, reactors and reactor systems (10) that include multiple microstructures (11a-11j) each having a first edge (26) and a second edge (28) and an entrance side (18) and including an entrance port (22) and one or more other ports (32a, 32b, 34a-34d) through the entrance side (18) with all of the ports through the entrance side (18) arranged in a standard pattern and closer to the first edge (26) than the second edge (28). Desirably, the entrance port (22) and an exit port (24) are concentric.

Advantages and additional features of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

BRIEF DESCRIPTION OF THE DRAWINGS

FIG. 1 (prior art) is a cross-sectional view of fluidic connection to a microstructure.

FIG. 2 (prior art) is a cross-sectional view of a further embodiment of a fluidic connection of the type shown in FIG. 1.

FIGS. 6A and 6B are schematic perspective views of a microstructure or microstructure module according to one aspect of the present invention, fitted within a frame.

FIG. 7 is a schematic perspective view of a microstructure or microstructure module having all ports nearer to one edge than the other.

FIG. 8 is a schematic partial plan view of another embodiment of a microstructure or microstructure module having all ports nearer to one edge than the other, with all ports on a common line, and FIG. 8B is a cross-sectional view of the microstructure or microstructure module of FIG. 8, taken along the line I-I indicated in FIG. 8.

FIG. 9 is a schematic partial plan view of still another embodiment of a microstructure or microstructure module having all ports nearer to one edge than the other, with all ports on a common line.

FIG. 10 is a schematic cross sectional view of a microstructure module comprising multiple microstructures.

FIG. 11 is a schematic diagram of a reactor system according to an embodiment of the present invention employing microstructures 11 or microstructure modules 12 of different sizes.

FIGS. 12 and 13 are schematic cross sections of microstructures or microstructure modules having differing relative positions of inlet and outlet ports.

FIG. 14 is a diagrammatic perspective cross section of a fluid connector useful with the microstructure or microstructure module of FIG. 13.

FIG. 15A is a bottom-up diagrammatic plan view of a portion of a structural member shown in FIG. 6C.

FIG. 16 is a top side diagrammatic perspective view of another connecting support structure.

DETAILED DESCRIPTION

Figure 5:
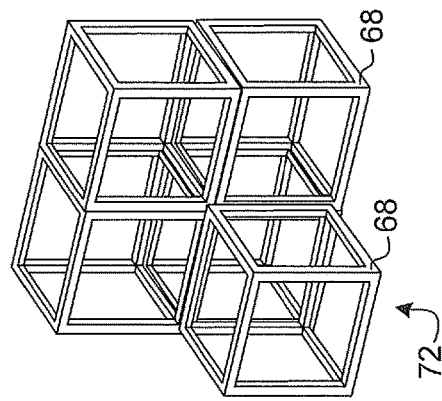
FIG. 5 (prior art) is a schematic perspective view of an assembly of frames of the type shown in FIG. 4.
Figure 4:
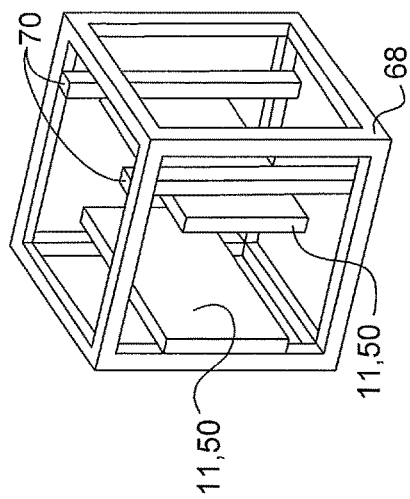
FIG. 4 (prior art) is a schematic perspective view of a structural frame used with the frames and microstructures of FIGS. 1-3.
Figure 3A:
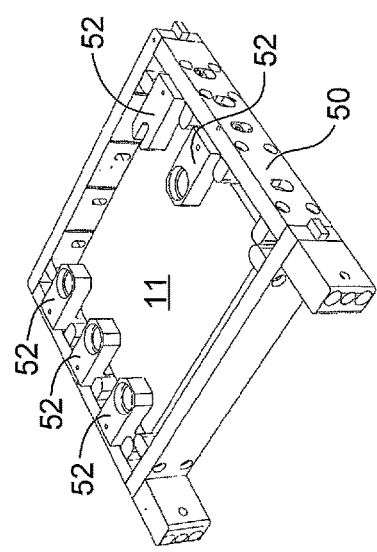
FIGS. 3A and 3B (prior art) are schematic perspective views of frames used with fluidic connections of the type shown in FIGS. 1 and 2.
Figure 3B:
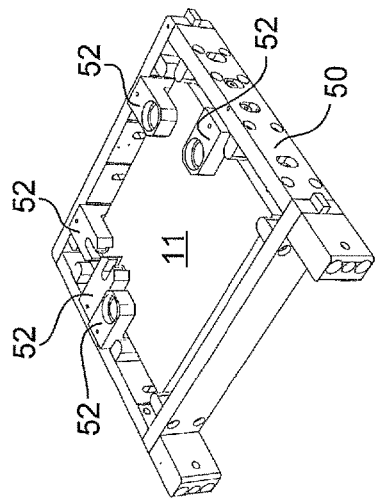

Reference will now be made in detail to the presently preferred embodiments of the invention, examples of which are illustrated in the accompanying drawings. Whenever possible, the same reference numerals will be used throughout the drawings to refer to the same or like parts.

Within this document, "microstructure" refers to a microfluidic device having internal passages with a characteristic cross-sectional dimension in the few-millimeter to sub-millimeter range. Microstructures may include, for instance, devices similar to and including those disclosed and described in U.S. Pat. No. 7,007,709 entitled "A Microfluidic Device and Manufacture Thereof," whether made by the method therein disclosed or other methods. "Reactor" refers to a device for performing chemical or physical processes or combinations thereof, the device including, in the context of this document, two or more microstructures connected for fluid communication therebetween. "Microstructure module" refers to a single microstructure or to two or more microstructures joined together fluidically and mechanically in a stack or other close configuration FIGS. 1-5 (prior art) have been discussed above.

FIG. 6A is a schematic perspective view and FIG. 6B is a side elevation view of a microstructure 11 or microstructure module 12 according to one aspect of the present invention, fitted within a frame 50. In each of the figures a microstructure 11 or microstructure module includes at least a first internal fluid passage (not shown but shown and discussed below in reference to FIGS. 12 and 13). Each microstructure 11 or microstructure module 12 includes an external surface 16 comprising an entrance side 18 and an exit side 20 opposite the entrance side 18. Each also has an entrance port 22 extending through the entrance side 18 of the microstructure 11 or microstructure module 12 to the first internal fluid passage, and an exit port (24) extending from the first internal fluid passage through the exit side 20. Each microstructure 11 or microstructure module 12 also has a first edge (26) and a second edge (28) opposite the first edge (26), the first and second edges (26, 28) extending from the entrance side (18) to the exit side (20).

According to one variation of the present invention, for each of the microstructures 11, the entrance port (22) and one or more other ports extending through the entrance side (18), such as ports 32a and 32b, generally used for a thermal control fluid, 34a-34d) are arranged in a standard pattern closer to the first edge (26) than the second edge (28), and the entrance port (22) and the exit port (24) are concentric. The standard pattern may desirably be a line at a set distance from the first edge 26. Desirably, such line is at a distance of 5 to 30 mm, and includes anywhere from 2 to 10 ports. All ports are desirably in the size range of 1 to 10 mm in diameter, preferably 1.5 to 5 mm, with thermal fluid ports more desirably in the size range of 2 to 5 mm and most desirably from 3 to 5 mm.

With all of the ports 22, 32a and 32b near one edge (the first edge 26) the fluid connections to the microstructure or microstructure module 11, 12, are readily accessible, as may be seen particularly in the view of FIG. 6B, which is a plan view straight toward the first edge 26 of the microstructure 11. From this one edge 26, all of the fluid connectors 30 are directly accessible, as well as the screws 74 by which the associated C-clamps are secured within the frame 50. A screw head 76 is also visible in FIG. 6B, which screw head cooperates in supporting the frame on an extended structural support member 40, as will be explained hereafter.

Figure 6C:
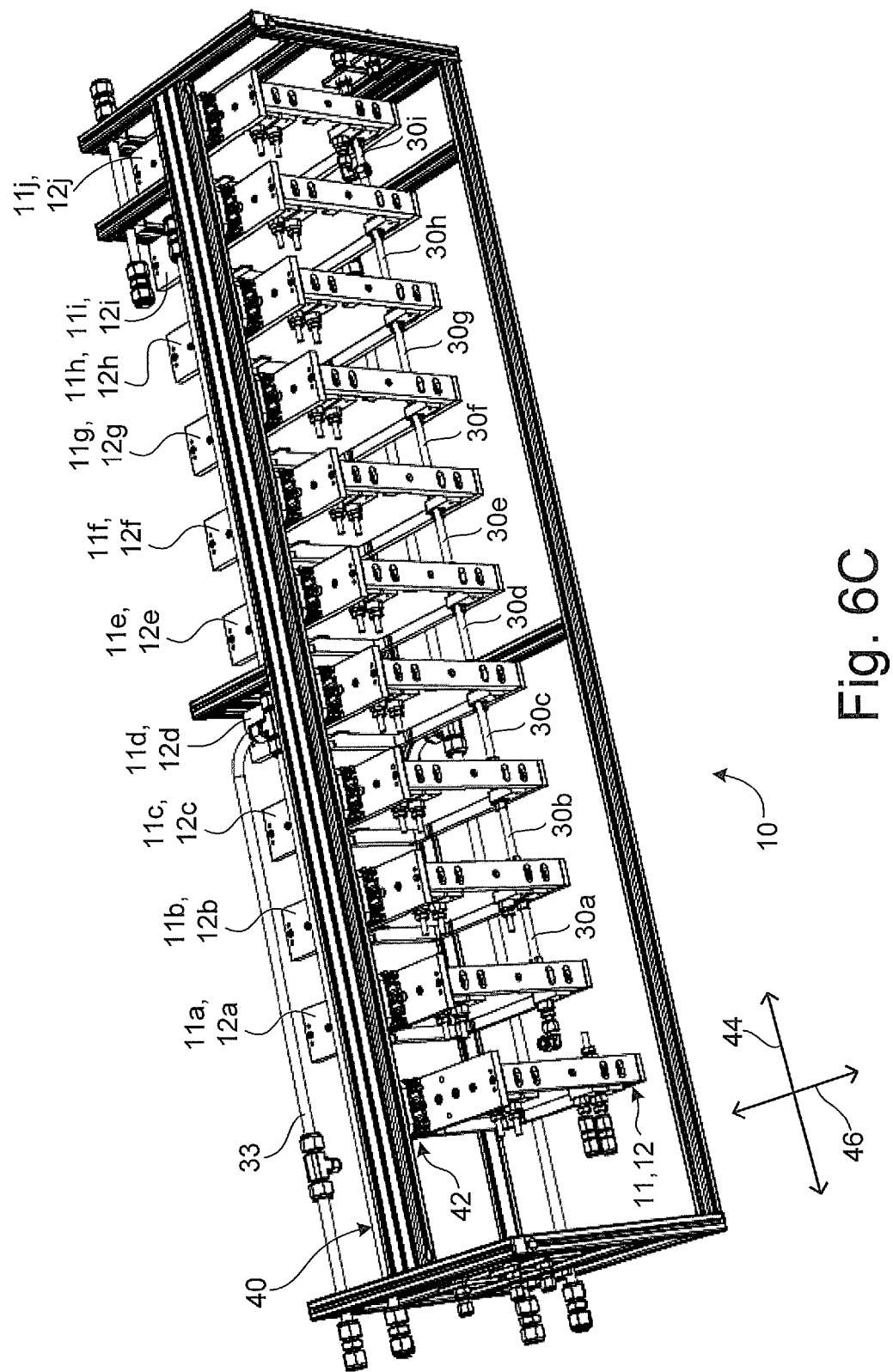
FIG. 6C is a schematic perspective view of a modular reactor or reactor system connected and supported according one or more aspects of the present invention.

FIG. 6C is a schematic perspective view of a modular reactor or reactor system in which such an extended structural support member 40 is shown, and on which each of several microstructures or microstructure modules 11a-11j, 12a-12j are independently supported on the extended member 40 by a respective connecting support structure 42 adjustable in at least two linear displacement degrees of freedom 44, 46, one parallel to the direction of the long direction of the extended member 40 and one perpendicular to the long direction of the extended member 40. This arrangement allows for easy assembly and easy individual replacement of microstructures or microstructure modules 11a-11j, 12a-12j.

Other advantageous aspects of the present invention, useful with or without the presence of an extended support member, may also be seen in FIG. 6. For instance, in the modular reactor or reactor system 10 of FIG. 6, several microstructures or microstructure modules 11a-j and 12a-j are connected in a single row, such that at least first, second and third microstructure modules (12a-12c, for instance) are each fluidically connected in successive order for fluid communication from one to the next. Each of the first, second and third modules also comprise at least a first internal fluid passage 14 (to be shown subsequently), and an external surface 16 comprising an entrance side 18 and an exit side 20 opposite the entrance side 18, with an entrance port 22 extending through the entrance side 18 of the module 12a-12c or microstructure 11a-11c, to the first internal fluid passage (14) and with an exit port (24) extending from the first internal fluid passage (14) through the exit side (20). A first edge (26) and a second edge (28) opposite the first edge are labeled in the figure, the first and second edges (26, 28) extending from the entrance side (18) to the exit side (20).

Particular advantage is found in that, for each of the first, second and third modules 12a-12c or microstructures 11a-11c, the entrance port 22 and the exit port 24 are positioned nearer to the first edge 26 of the module 1a-12c than to the second edge 28, and in that the exit side 20 of the first module 12a faces the entrance side 18 of the second module 12b with the exit port 24 of the first module 12a concentric with or offset a specified distance from the entrance port 22 of the second module 12b. Similarly, the exit side 20 of the second module 12b faces the entrance side 18 of the third module 12c with the exit port 24 of the second module 12b concentric with or offset the same specified distance from the entrance port 22 of the third module 12c. The first edges 26 of the first, second and third modules 12a-12c are aligned, and a first fluid connector 30a extends from the exit port 24 of the first module 12a to the entrance port 22 of the second module 12b, and a second fluid connector 30b extends from the exit port 24 of the second module 12b to the entrance port 22 of the third module 12c.

This results in the possibility of many fluidic connections in a row, all well accessible from the side, and all using standardized fluid connectors 30. Where the exit port 24 of the first module 12a is concentric with the entrance port 22 of the second module, microstructures or microstructure modules 11, 12 such as the one shown in diagrammatic cross section in FIG. 12 are preferably used. There, the entrance port 22 through the entrance side 18 of the module joins the first fluidic path 14, which remains mainly in the center of three layers. A second fluidic path 36, useful for thermal control fluid, is found in the remaining portion of the outer layers. With the first edges aligned as in FIG. 6A, and with edges adjacent to the first also aligned, exit ports 24 are directly aligned to, or concentric with, entrance ports 22. This allows simple, direct, straight fluid connectors 30 to be used between each module 12.

Where the exit port 24 of the first module 12a is offset a specified distance from the entrance port 22 of the second module, microstructures or microstructure modules 11, 12 such as the one shown in diagrammatic cross section in FIG. 13 are preferably used. There, the entrance port 22 through the entrance side 18 of the module joins the first fluidic path 14, which is able to more easily stay in the center of the three layers, as there is no conflict between the internal volume required for the entrance port 22 and the exit port 24, as there is in the embodiment of FIG. 12. In the embodiment of FIG. 13, as in FIG. 12, a second fluidic path 36, useful for thermal control fluid, is found in the portions of the outer layers not used by the first fluidic path 14. With the first edges 26 aligned as in FIG. 6A, and with edges adjacent to the first edge 26 also aligned, exit ports 24 are aligned with entrance ports 22 but offset by a specified distance 54. A fluid path translation of this same amount, the specified distance 54, is built into an alternative fluid connector 30, shown in diagrammatic perspective cross section in FIG. 14. The connector 30 of FIG. 14 thus allows direct, straight fluid connectors 30 to be used between each successive module 12, as long as the specified distance 54 worth of offset is maintained.

A few presently preferred arrangements of ports (22, 32a, 32b, 34a-34d are shown in FIGS. 7-9 and 8B. As explained with reference to FIG. 12, in one presently preferred alternative according to the present invention, depicted in diagrammatic perspective view in FIG. 7, an entrance port 22 (shown as a small circle) and an exit port 24 (shown as a large dark circle) (for a first fluid path 14) are desirably concentric but on opposing sides 18, 20, of a micro-structure or microstructure module 11, 12.

Entrance and exit ports 32a, 32b for a second fluid path are desirably both on the same side, here on the front side 18 of the module 12 (which side is facing backward in the figure). All of the ports 22, 24, 32a, and 32b are desirably near one edge, designated herein the first edge 26, at least nearer that edge than the second edge 28. Desirably the ports are significantly nearer edge 26 than edge 28, such as two or three times nearer, and possible more.

FIG. 8 is a schematic partial plan view of another embodiment of a microstructure or microstructure module 11, 12, this time with the entrance side 18 facing front, and having all ports nearer to one edge (the first edge 26) than the other, but in this case with all ports in a specific pattern on a common line 28. (The line 38 need not be a physical structure, merely geometrical is also intended.) FIG. 8B is a cross-sectional view of the microstructure module 11, 12 of FIG. 8, taken along the line I-I indicated in FIG. 8, (which corresponds with the common line 28). Relative to the ports already shown and discussed in FIG. 7, the embodiment of FIG. 8 adds an additional entrance port 34a into the first internal fluid passage 14. Alternatively, port 34a may be a through-port that passes directly through the module or microstructure without entering internal any passages in the module other than the direct line perpendicularly through the microstructure.

FIG. 9 is a schematic partial plan view of another embodiment of a microstructure or microstructure module 11, 12, similar to that of FIG. 8, but with multiple additional entrance ports 34a-34d to the first internal fluid passage (not shown here) instead of just one as in FIG. 8. In either embodiment, it is desirably that the ports be arranged on a standard distribution. One such standard distribution could be the one shown by the common ports between the embodiments of FIG. 8 and FIG. 9. The additional ports of FIG. 9 are on the same line, but do not change the location of the ports corresponding to those on the module of FIG. 8. The standard distribution may be grouped at one end of the microstructure or module, or at both ends, or may be spread more or less evenly along the first edge. One or more additional exit ports (not shown) from passage 14 through the exit side 20 may also be employed, if desired.

As defined hereinabove, a microstructure module may be one or multiple microstructures, where the multiple microstructures are joined together fluidically and mechanically in a stack or other close configuration. FIG. 10 is a schematic cross sectional view of such a microstructure module 12 comprising multiple microstructures 11a-11e. The module 12 includes ports 32a, 32b, 22, 24, that provide fluidic access to the microstructures 11a-11e. The microstructures 11a-11e may be joined together mechanically and sealed fluidically by any suitable means, in including gaskets or more permanent means. The entrance side surface of the first microstructure 11a then becomes the entrance side 18 of the module 12, while the exit side of the last microstructure 11d similarly becomes the exit side 20 of the module 12, as shown.

FIG. 11 is a schematic diagram of a reactor system according to an embodiment of the present invention employing microstructures 11 or microstructure modules 12 of different sizes. Frames 50 of differing size may hang from the same extended structural support member 40. In this embodiment, as suggested by the arrows, the entrance and exit ports are aligned concentrically despite the different lengths and/or widths of the modules/microstructures 12/11 placed together in the system 10.

Figure 15B:
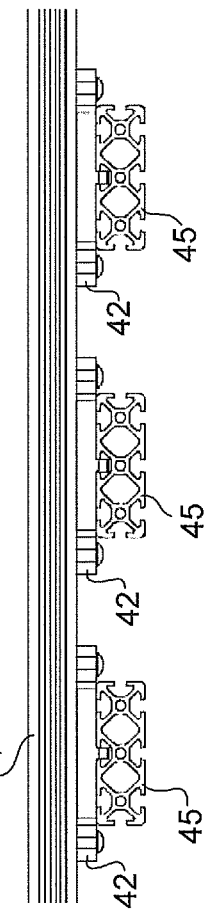
FIG. 15B is a diagrammatic cross-sectional view of the portion of the structural member shown in FIG. 15.

FIG. 15A is a bottom-up diagrammatic plan view, and FIG. 15B is a diagrammatic cross-sectional view, of a portion of the extended structural support member 40 shown in FIG. 6C. In these embodiments, the support member 40 is in the form of an extruded metal rail 41. Mounted on the portion shown of the rail 41 are three orthogonal extruded rail pieces 45, joined to the long rail 41 by individual connecting support structures 42.

Figure 16:
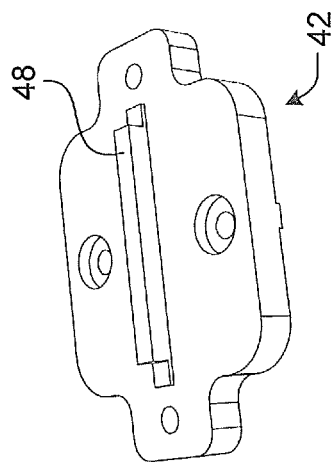
FIG. 16 is a top side diagrammatic perspective view of a connecting support structure.
Figure 17:
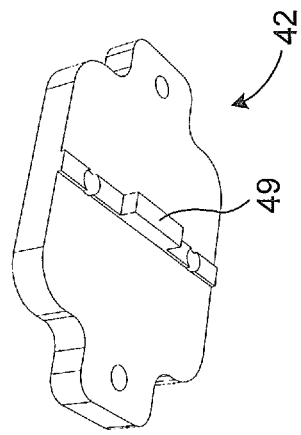
FIG. 17 is a bottom side diagrammatic perspective view of the connecting support structure of FIG. 16.

FIG. 16 is a top side diagrammatic perspective view of a connecting support structure 42, while FIG. 17 is a bottom side diagrammatic perspective view of the connecting support structure 42 of FIG. 16. In use, the structure 42 is fixed rigidly to the associated orthogonal rail piece, with a lower rail-engaging member 49 aligning with the central depression in the associated orthogonal rail 45. At the top of the structure 42, screw heads (not shown) are left protruding so as to be captured within the channels of the long extruded rail 41, providing secure attachment with freedom to move along the length of the rail 41. Thus arises freedom to move in the direction, or linear displacement degree of freedom, 44, parallel to the length of the extended structural support member 40 (see FIG. 6 for a labeled arrow showing the direction). The large upper rail engaging member aligns with and extends upward into the central slot in the lower side of the rail 41, and assists in preventing binding.

Figure 19:
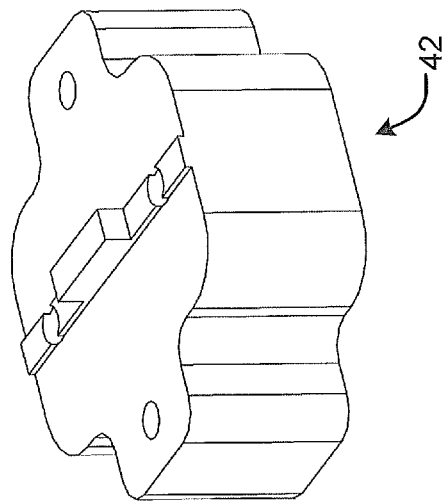
FIG. 19 is
Figure 18:
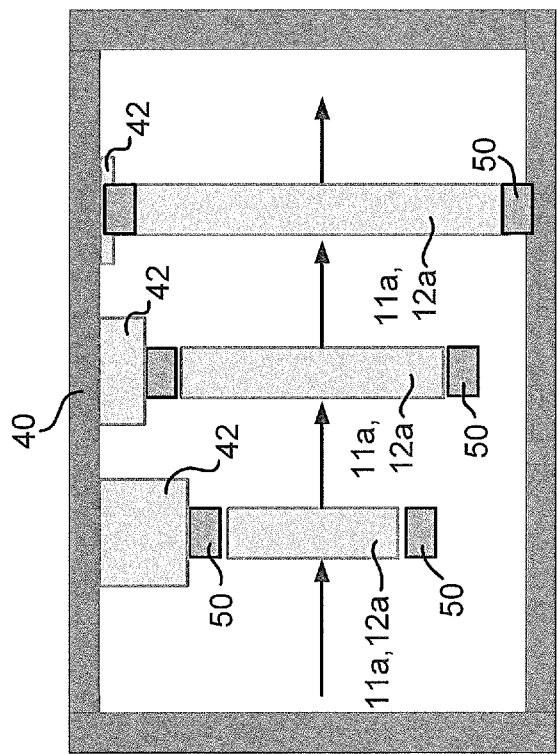
FIG. 18 is a schematic diagram of another reactor system according to an embodiment of the present invention employing microstructures 11 or microstructure modules 12 of different sizes.

FIG. 18 is a schematic diagram of another reactor system according to another embodiment of the present invention employing microstructures 11 or microstructure modules 12 of different sizes. As suggested by the arrows, the entrance and exit ports that are aligned concentrically could reside at the center of the first edge 26 of the modules or microstructures 12, 11. Frames 50 of differing size may thus hang from the same extended structural support member 40, but at different heights, as shown. The different heights may be optionally be provided by connecting support structures 42 of different thickness, as shown symbolically in FIG. 18 by various vertical cross sections of structures 42. In the diagrammatic perspective view of FIG. 19, one example of a structure 42 of increased height is shown.

Figure 20:
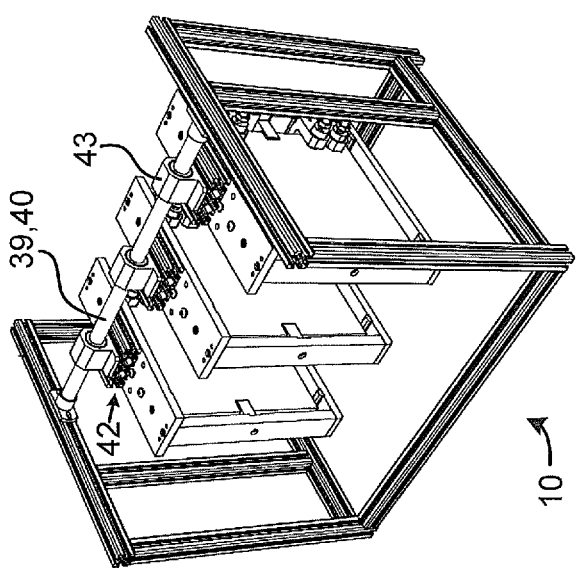
FIG. 20 is a schematic perspective view of another embodiment of a modular reactor or reactor system.

Of course a support member 40 other than an extruded rail 41 may be used. One alternative is shown in the modular reactor or system 10 of FIG. 20, in which the elongated structural support member 40 is in the form of a rod 39, on which are carried individual linear bearings 43 as part of the respective connecting support structures 42. Such an arrangement allows for low friction and ease of moving microstructures or microstructure modules in the direction 44 parallel to the length of the support member 40. Such low friction support could also allow a small degree of motion of frames 50 relative to one another during operation of the reactor to accommodate thermal expansion of the straight fluid connectors 30.

There are many advantages of the modular reactor and reactor system the present invention. Some are common to all variants, while others are limited to specific variants. Most of them will be recognized by those of ordinary skill in the art.

Figure 21:
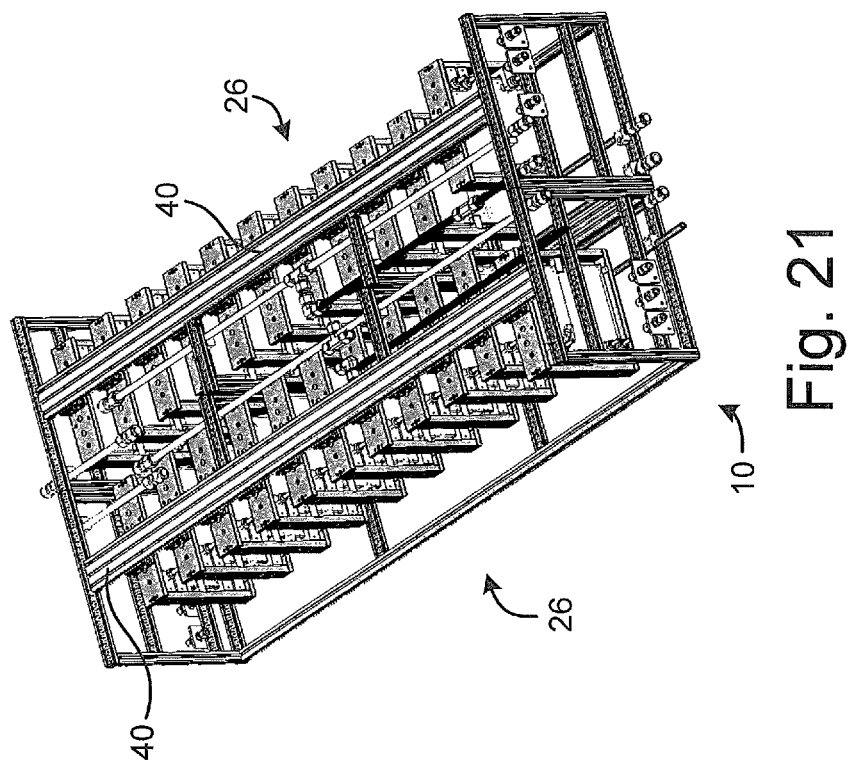
FIG. 21 is a schematic perspective view of another variation on a modular reactor or reactor system.

One such advantage may be seen relative to FIG. 21, which is a schematic perspective view of a modular reactor or reactor system including two extended structural support members arranged in parallel and substantially the same height, each with multiple modules or microstructures 12, 11 suspended wherefrom. Particularly advantageous in this arrangement is that the first edges of all of the modules or microstructures 12, 11 are facing outward. Thus the modules or microstructures 12, 11 may be placed very close together (in the location down the middle of the reactor/system 10 in the figure), while still allowing full access for an assembler, technician, operator, or repair person to adjust, and maintain fluid connections and replace microstructures or modules 11, 12 as desired or needed. Of course, multiples of these twin rows may be stacked vertically, for a compact reactor footprint.

Other advantages include, but are not limited to the following.

Ease of use and troubleshooting is increased. The straightforward layout of the modular reactors, of the present invention and creatable within the system of the present invention, with all inlets and outlets visible on a single side of reactor or row FIG. 6C, means that a given reactor is much more easily understood or comprehended. Trouble shooting can be done from a single side, the front side and it is no longer necessary to have access to all four sides of a reactor. The back side of reactor can put against a wall without any problem for maintenance. Putting such a reactor into a hood is quite possible, with few if any constraints.

Assembly time is reduced. Because all microstructures or modules are mounted the same way, and because all connections are implemented the same way, reactor assembly time is significantly reduced.

Mechanical architecture is simplified and mechanical complexity reduced. Having the same connection pattern for all microstructures, regardless of function, means the same mechanical interface may be used throughout (unlike in FIGS. 4a and 4b) and therefore of the number of unique mechanical parts is achieved Increased standardization is achieved in microstructure fabrication.

Standardization of connection patterns for all different fluidic designs means a reduction of the number of different drilling patterns. Fabrication of different microstructure designs is then more standardized and less difficult.

Short direct connection between microstructures is achieved.

The fact that product outlet is located concentrically or with a defined offset in front of reactant inlet allows for short and straight connections between two modules or microstructures. This avoids the need to bend tubing for connections and significantly reduces the need for various custom fittings. It is thus easily possible to create straight short connections (interconnections between microstructures or modules) with the use of only materials which can be readily FDA-certified. For example, the connector 30 or the entire fluid-contacting portion of the connector 30 can be machined from PTFE or specific grades of PFA.

Compactness is improved. Thanks to product outlet located in same axis or with defined small offset relative to main reactant inlet, it is possible to align all microstructures and having direct short connections, without need to flip microstructures or to translate horizontal some in order to align connections. Benefit for the reactor is higher compactness. (FIG. 6)

Unlike in the past, with standard connection patterns it is now convenient to associate, within the same reactor, microstructures of different sizes.

The methods of use and/or the devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

The invention claimed is:

1. A modular reactor comprising:
   at least first, second and third microstructure modules each fluidically connected in successive order for fluid communication from one to the next, each of the first, second and third modules comprising:
   at least a first internal fluid passage;
   an external surface comprising an entrance side and an exit side opposite the entrance side;
   an entrance port extending through the entrance side of the module to the first internal fluid passage;
   an exit port extending from the first internal fluid passage through the exit side;
   a first edge and a second edge opposite the first edge, the first and second edges extending from the entrance side to the exit side;
   first and second fluid connectors; and
   an extended structural support member having a length and a long direction parallel to said length, and, for each respective microstructure module, a respective connecting support structure supporting the respective microstructure module on the extended member by the respective connecting support structure adjustable in at least two linear displacement degrees of freedom, a first linear displacement degree of freedom parallel to the long direction of the extended member and a second linear displacement degree of freedom perpendicular to the long direction of the extended member;
   wherein, for each of the first, second and third modules, all entrance ports and all exit ports are positioned nearer to the first edge of the module than to the second edge, and the exit side of the first module faces the entrance side of the second module with the exit port of the first module concentric with or offset a specified distance from the entrance port of the second module, and the exit side of the second module faces the entrance side of the third module with the exit port of the second module concentric with or offset the specified distance from the entrance port of the third module, and the first edges of the first, second and third modules are aligned, and the first fluid connector extends from the exit port of the first module to the entrance port of the second module, and the second fluid connector extends from the exit port of the second module to the entrance port of the third module.

2. The modular reactor according to claim 1 wherein the entrance port and the exit port of the first module are concentric.

3. The modular reactor according claim 2 wherein the first module comprises a second internal fluid passage and an entrance port and an exit port for the second internal fluid passage, and wherein the entrance port and the exit port for the second internal fluid passage both extend through the entrance side of the first module.

4. The modular reactor according to claim 2 further including at least one additional entrance port extending through the entrance side of the first module to the first internal fluid passage.

5. The modular reactor according to claim 2 wherein the entrance port and all other ports through the entrance side of the first module are arranged in a line.

6. The modular reactor according to claim 2 wherein the modules each have a respective size and wherein said respective sizes vary.

* * * * *